July 31, 1956 — C. H. MEILE — 2,756,733
VALVE TAPPET ASSEMBLY
Filed Dec. 23, 1953 — 2 Sheets-Sheet 1

INVENTORS
CARL H. MEILE
Paul O. Pippel
ATTORNEY

INVENTORS
CARL H. MEILE
Paul O. Pippel
ATTORNEY

United States Patent Office 2,756,733
Patented July 31, 1956

2,756,733

VALVE TAPPET ASSEMBLY

Carl H. Meile, Fort Wayne, Ind., assignor to International Harvester Company, a corporation of New Jersey Application December 23, 1953, Serial No. 399,959

10 Claims. (Cl. 123—90)

This invention relates to internal combustion engines and more particularly to a new and improved valve tappet assembly wherein the valve tappet is self-adjusting.

It is fairly well established that excessive wear and failures of the engaging surfaces of the valve tappets and cam lobes of an internal combustion engine are due, in part, to pitting of the contacting surfaces. Pitting is caused primarily by the development of abnormally high contact surface stress areas on the mating surfaces and ultimately results in a failure of the tappet or cam lobe or both when the stresses exceed the safe limit of the material of which the parts are made.

The localized high surface stress areas are developed by non-uniformly transmitting the driving force of the cam lobe to the tappet face. Assuming that full and uniform line contact always existed between the tappet face and the entire width of the cam contact face, it is unlikely that pitting would occur. However, this ideal contact relationship between the cam and tappet is difficult to achieve and is commercially impossible to obtain where the engines are manufactured in large volumes inasmuch as production processes may, from time to time, deviate from the desired tolerances. Practically speaking, it is impossible to machine the cam shafts, cam lobes, cam shaft bearings, and valve guide bores whereby the contact surfaces of the cam lobes are perfectly parallel to the cam shaft axis of rotation. Furthermore, because of bearing inaccuracies and misalignments the longitudinal axes of the tappet bores, and, hence the tappets, are not perpendicular to the cam shaft axis. Thus, the tappet cam-engaging surfaces are not parallel to the cam shaft axis and the contact surfaces of the cam lobes. Hence, if the cam surface is inclined from the tappet face and only a portion of the cam surface engages a corresponding portion of the tappet face, a high surface stress is caused to be developed in the region of the engaging portions. As an example, assuming that the cam surface is tapered 0.0002 of an inch toward the cam shaft axis from one edge thereof, or the cam shaft axis itself is inclined, the conventional tappet face would then only engage one edge of the cam lobe profile.

It is, therefore, the primary object of the present invention to minimize high surface stress concentrations in valve tappets by providing a swivelly mounted, self-aligning tappet which will, during operation of the engine, continuously and automatically assume positions wherein the tappet surface and cam surface engaged thereby are aligned or parallel. In other words, the invention contemplates the provision of a reciprocably mounted tappet capable of moving angularly a small amount with respect to the longitudinal axis of the tappet guide bore whereby the tappet cam-engaging surface is maintained in line contact, as distinguished from point contact, with the cam surface to thereby compensate for any misalignment between the tappet face and the engaged surface of the cam lobe. In order to accomplish this objective, the surface of the tappet guide defining the tappet bore formed therein through which the tappet extends is in the form of a hyperboloid. Of the sections of the tappet guide normal to the longitudinal axis of the bore the section located approximately midway between the ends of the bore has the smallest bore diameter and the smallest bore diameter is slightly greater than the tappet stem or body diameter. By virtue of the above construction, the tappet is, in effect, swivelly as well as reciprocably mounted in the tappet guide and the tappet face is, therefore, capable of continually adjusting itself to be squarely engaged by the cam surface while the tappet is being reciprocated by the cam.

The self-alignment features of this tappet assembly permit its incorporation in marine diesel engines, in which it is common practice to reverse the direction of rotation of the crankshaft. It will be appreciated that the improved tappet of the tappet assembly of the present invention will immediately adjust itself to a position affording line contact with the cam surface when the direction of rotation is changed.

A still further object of the invention is to reduce the cost of manufacturing internal combustion engines by relaxing the close manufacturing tolerances of cam shafts, cam lobes, cam shaft bearing alignments, and valve tappets by providing a valve tappet assembly which compensates for any misalignment of the cam surface and tappet face.

The foregoing and other important objects and desirable features inherent in and encompassed by the invention, together with many of the purposes and uses thereof, will become readily apparent from a reading of the ensuing description in conjunction with the annexed drawings, in which.

Figure 1:
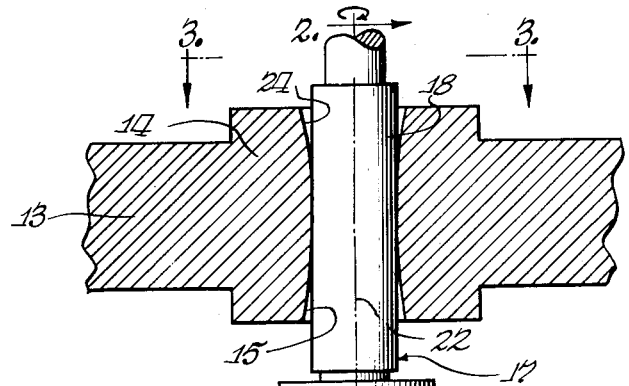
Figure 1 is a side elevational view, partly in cross section, showing a valve tappet assembly, manufactured in accordance with the present invention, and a section of a cam shaft.

Referring to the drawings in detail, wherein like reference characters represent like elements throughout the various views, there is shown a section of an engine cam shaft 10 having an axis of rotation 11. A plurality of cam lobes 12 (only one is shown) are formed on the cam shaft 10 along the rotatonal axis 11 thereof.

The engine block is designated generally by the numeral 13 and has a wall thereof disposed above the cam shaft 10. A valve tappet guide 14 is shown integrally formed with the engine block 13, but it is to be understood that the guide 14 could be made as a separate part and rigidly fastened to the engine block 13 without departing from the spirit and scope of the invention. The tappet guide 14 is provided with a bore 15 which has a longitudinal axis 16 designed to intersect the rotational axis 11 of the cam shaft 10 at a right angle.

The valve tappet 17 includes a cylindrically-shaped stem or body 18 which extends through the bore 15 of the valve guide 14. Integrally-formed on the lower end of the stem or body 18 is a mushroom-shaped tappet head 19 which has a flat cam-engaging face 20. The flat cam-engaging face 20 lies in a plane (indicated by line 21) which is perpendicular to the longitudinal axis 22 of the valve tappet stem or body 17. The tappet face 20 is continually urged toward and into contact with the cam surface 23 by resilient means such as a valve spring (not shown) and, in normal operation, upon rotation of the cam shaft 10, the valve tappet 17 is reciprocated vertically in the valve guide 14 to actuate an intake or exhaust valve (not shown) of the internal combustion engine.

In conventional valve tappet assemblies, the surface of the valve guide defining the bore through which the tappet stem reciprocates is cylindrical in form. The present invention contemplates making the guide surface 24 in the form of a hyperboloid rather than cylindrical. The degree the surface 24 departs from a true cylindrical surface has been exaggerated for the purpose of illustration. As shown in the drawings, the mid section of the tappet guide 14 has the smallest bore diameter and, it is to be understood, the smallest bore diameter is sufficient to accommodate the diameter of the tappet stem or body 18 is a sliding fit. By virtue of the hyperboloid surface 24, the valve tappet 17 and, hence, the tappet face 20, is capable of moving angularly with respect to the longitudinal axis 16 of the bore 15 as well as vertically with respect to the cam shaft axis 11.

Figure 2:
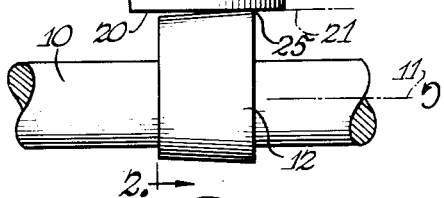
Figure 2 is a sectional view taken substantially along line 2—2 of Figure 1 showing the cam surface sloping toward the rotational axis of the cam shaft and misaligned with respect to the tappet face.
Figure 3:
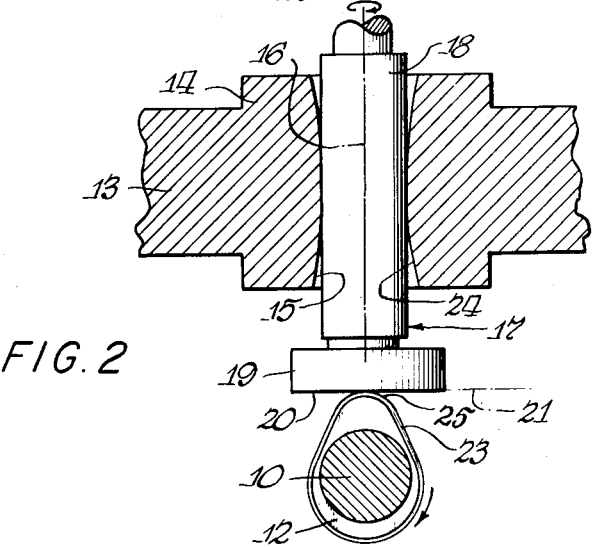
Figure 3 is a plan view of the tappet assembly shown in Figure 1.
Figure 4:
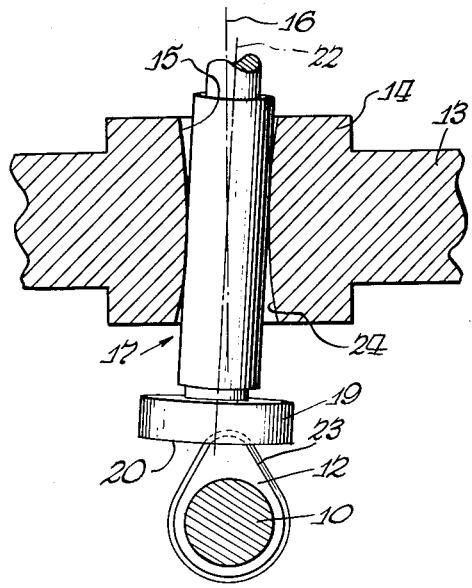
Figure 4 is a view similar to Figure 1 showing the valve tappet after it has adjusted itself to compensate for the tapered cam surface.
Figure 5:
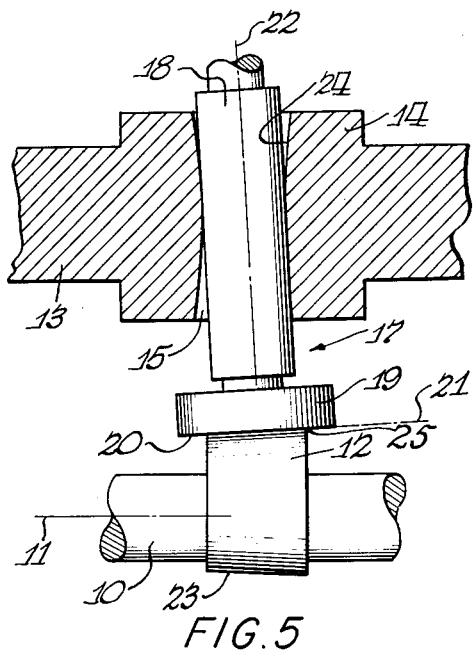
Figure 5 is a sectional view taken at right angles to the view of Figure 4.
Figure 6:
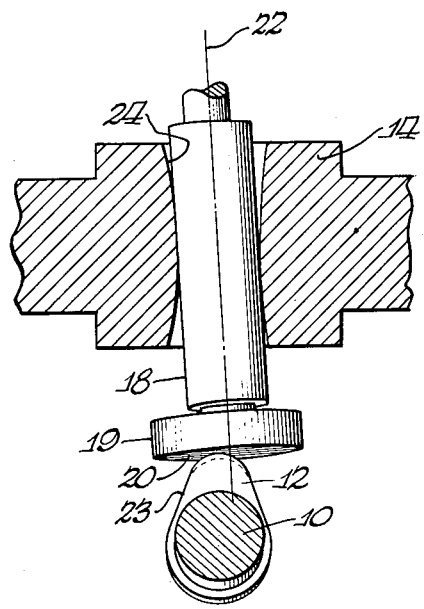
Figure 6 is a side elevational view, partly in cross section, showing a valve tappet after it has adjusted itself to compensate for an inclined, misaligned cam shaft axis.
Figure 7:
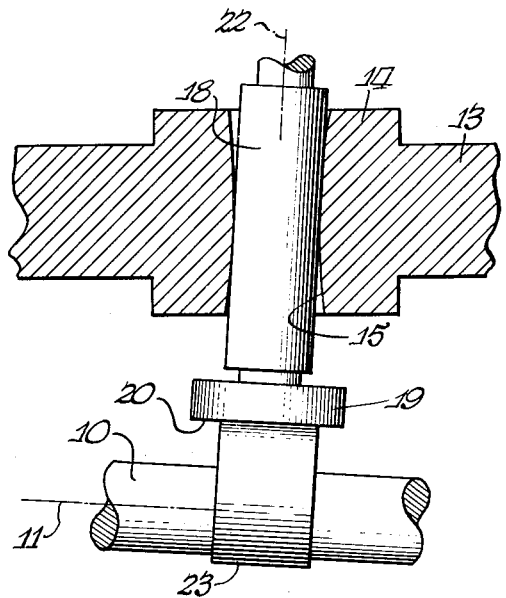
Figure 7 is a sectional view taken at right angles to the view of Figure 6.

In operation, assuming the cam surface 23 is not disposed at right angles to the longitudinal axis 16 of the bore 15 and is inclined or tapered to the left toward the rotational axis 11 of the cam shaft 10, as shown in Figure 2, only one edge 25 of the cam surface 23 engages the tappet face 20. Inasmuch as the tappet face 20 is continually urged toward the cam lobe 12 by resilient means, as pointed out above, and the cam lobe 12 is rotated about axis 11 in the direction of the arrow, the valve tappet 17 swivelly adjusts itself so that the tappet face 20 is brought parallel with the cam surface 23, as shown in Figures 4 and 5, thereby permitting the cam surface 23 to track squarely across the face 20 of the tappet 17. Figures 6 and 7 illustrate the adjusted position taken by the valve tappet 17 when the cam shaft axis 11 is misaligned and inclined upwardly to the left, as viewed in Figure 6. It will be appreciated that the valve tappet 17 is capable of continually adjusting itself to insure uniformly distributed stress without impairing the normal reciprocating movement thereof. Regardless of the particular adjusted position assumed by the valve tappet 17, a relative large area of the hyperboloid surface 24 is always in sliding contact with the cylindrical stem 18 of the tappet.

The embodiment of the invention chosen for the purposes of illustration and description herein is that preferred as the result of selective tests based upon the requirements for achieving the objects of the invention and developing the utility thereof in the most desirable manner, due regard being had to existing factors of economy, simplicity of design and construction, production methods, and the improvements sought to be effected. It will be appreciated, therefore, that the particular structure and functional aspects emphasized herein are not intended to exclude, but rather to suggest, such other adaptations and modifications of the invention as fall within the spirit and scope of the invention as defined in the appended claims.

What is claimed is:

1. A valve tappet assembly comprising a tappet; a tappet guide; and means for swivelly and reciprocably mounting said tappet in said tappet guide.

2. A valve tappet assembly comprising a tappet guide; a tappet having an elongated cylindrical stem; and means for swivelly and reciprocably mounting said stem in said tappet guide.

3. A valve tappet assembly comprising a tappet guide; a tappet including a stem and a head at one end of said stem having a cam-engaging face; and means for swivelly and reciprocably mounting said stem in said tappet guide whereby said tappet may continually adjust itself to positions wherein said cam-engaging face engages an associated cam surface squarely.

4. A valve tappet assembly comprising a tappet guide; a tappet including an elongated, cylindrical stem and a head at one end of said stem, said head having a flat cam-engaging face lying substantially in a plane disposed normal to the longitudinal axis of said stem; and means for mounting said stem in said tappet guide whereby said face may move vertically and angularly with respect to said tappet guide.

5. A valve tappet assembly comprising a tappet; a tappet guide having a bore therethrough; and means for swivelly and reciprocably mounting said tappet in said tappet guide, a portion of said tappet extending through said guide bore.

6. A valve tappet assembly comprising a tappet including an elongated, cylindrical stem having a head at one end thereof, said head having a flat cam-engaging face lying substantially in a plane disposed normal to the longitudinal axis of said stem; a tappet guide having a bore therethrough; and means for swivelly and reciprocably connecting said stem to said tappet guide, said stem extending through said guide bore.

7. A valve tappet assembly comprising a tappet including an elongated cylindrical stem having a head at one end thereof, said head having a flat cam-engaging face lying substantially in a plane disposed normal to the longitudinal axis of said stem; a tappet guide having a bore therethrough for receiving said stem; and means for connecting said stem to said tappet guide for permitting said cam-engaging face to reciprocate longitudinally along and angularly with respect to the longitudinal axis of said guide bore.

8. A valve tappet assembly substantially as set forth in claim 7, in which, said means includes the surface of said tappet guide defining said bore, said surface being hyperboloidal in shape.

9. A valve tappet assembly substantially as set forth in claim 8, in which, the section of the tappet guide normal to the longitudinal axis of said guide bore having the smallest bore diameter is located approximately midway between the ends of the bore and the smallest bore diameter is slightly greater than the diameter of said stem.

10. A valve tappet assembly comprising a tappet including an elongated cylindrical stem having a head at one end thereof, said head having a flat cam-engaging face lying substantially in a plane disposed normal to the longitudinal axis of said stem; a tappet guide having a bore therethrough for receiving said stem; and means for connecting said stem to said tappet guide for permitting said cam-engaging face to reciprocate longitudinally along and angularly with respect to the longitudinal axis of said guide bore including the surface of said tappet guide defining said bore, said bore progressively decreasing in diameter from its ends toward the mid section thereof, the smallest diameter of said bore being sufficient to accommodate the diameter of said stem.

References Cited in the file of this patent
UNITED STATES PATENTS

| | | |
|---|---|---|
| Re. 14,228 | MacVicar | Dec. 12, 1916 |
| 1,631,218 | Milbrath | June 7, 1927 |